Sept. 2, 1947.         E. MAYER         2,426,892

FISHHOOK SHARPENER

Filed April 14, 1947

INVENTOR.
EVERETT MAYER.
BY
*Thos. L. Donnelly*
ATTORNEY.

Patented Sept. 2, 1947

2,426,892

UNITED STATES PATENT OFFICE 2,426,892

FISHHOOK SHARPENER

Everett Mayer, Detroit, Mich.

Application April 14, 1947, Serial No. 741,168

5 Claims. (Cl. 51—205)

My invention relates to a new and useful improvement in a sharpening device for fish hooks and similar parted articles. The invention is particularly adapted for fish hooks and it is an object of the present invention to provide a device of this class which will be simple in structure, economical of manufacture, durable, light, compact, easy operated and highly efficient in use.

Another object of the invention is the provision of a fish hook sharpener of this class having a retainer adapted for retaining an abrasive element so arranged and constructed that the barb of the point of the fish hook may be easily inserted therein and quickly sharpened.

Another object of the invention is the provision of a fish hook sharpener of this class comprising a handle and a retainer for retaining an abrasive so constructed and arranged that a rotary movement back and forth may be easily effected on the point of a fish hook for quickly sharpening the same.

Other objects will appear hereinafter.

It is recognized that various modifications and changes may be made in the detail of structure illustrated without departing from the invention and it is intended that such shall be embraced within the scope of the claims which form a part hereof.

Forming a part of this specification are drawings in which.

Figure 1:
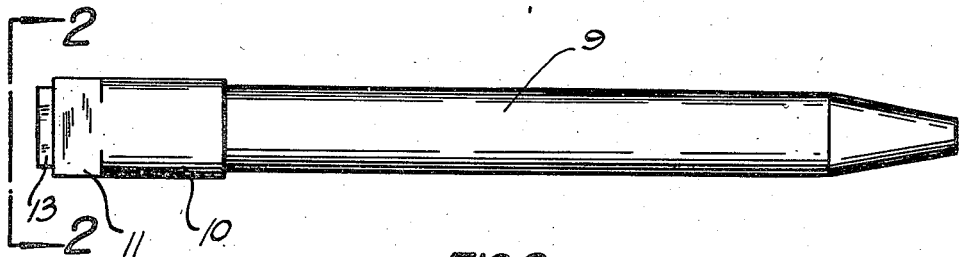
Fig. 1 is a side elevational view of the invention slightly enlarged.
Figure 2:
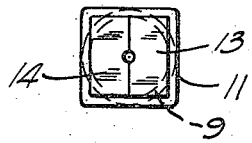
Fig. 2 is an end elevational view of the invention taken on line 2—2 of Fig. 1.
Figure 3:
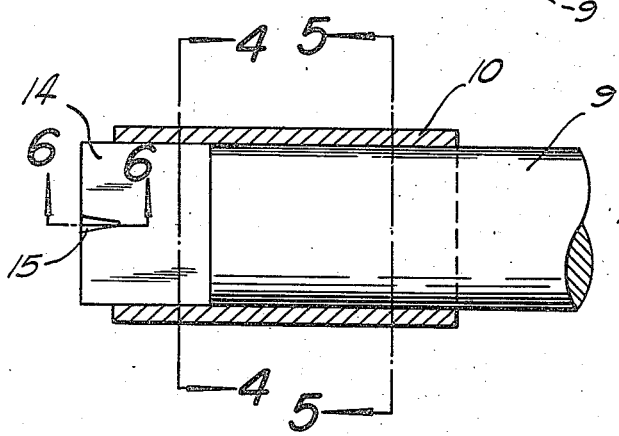
Fig. 3 is a fragmentary view showing parts in section slightly enlarged.
Figure 7:
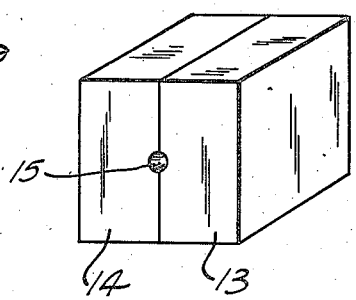
Fig. 7 is a perspective view of the abrasive blocks used in the invention.
Figure 5:
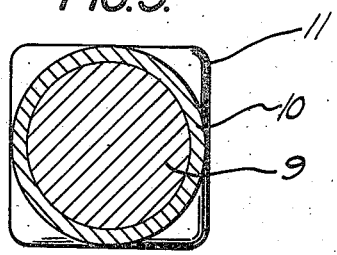
Fig. 5 is a sectional view taken on line 5—5 of Fig. 3.
Figure 4:
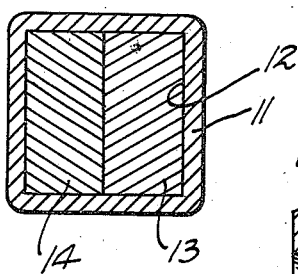
Fig. 4 is a sectional view taken on line 4—4 of Fig. 3.
Figure 6:
Fig. 6 is a fragmentary, sectional view taken on line 6—6 of Fig. 3.

As shown in the drawing, the invention comprises a gripping portion or handle 9 which may be formed from wood or other suitable material and which may not be larger around than the ordinary lead pencil. Embracing one end of this handle 9 is a cylindrical sleeve 10 terminating at its end which projects beyond the end of the handle 9 in a squared portion 11 having a bore 12 with flat faces and rectangular in cross section, as indicated by the numeral 12. Pressed tightly into this flat face bore 12 is a pair of blocks 13 and 14 from suitable abrasive material. If desired, the abrasive material may be formed in one block to tightly fit within the bore 12 by a press fit. Formed in each of these blocks at their meeting faces at their outer face is a recess 15 which is tapered inwardly, as clearly shown in Fig. 6, so that these recesses co-operating provide a conical recess extending inwardly from the outer face of the abrasive material.

The barb of a fish hook proceeds diagonally from the end of the point and in use, when the point of the fish hook is placed in this conical recess, the surface of the barb will serve as a guide. In use, the operator would place the point of the fish hook in the conical recess and then, by gripping the handle 9 in the fingers of one hand, while holding the fish hook in the other, rotate the handle 9 back and forth. This rotation may be easily and quickly effected with the result that the point of the fish hook is very quickly sharpened and this sharpening effect also extends to the barb. In this manner, a fish hook may be easily and quickly sharpened and brought to a high degree of efficiency.

The device is one which may be carried in the pocket and which is possessed of the advantages hereinabove enumerated. The abrasive blocks 13 and 14 may be formed from carborundum, sand, stone or other suitable abrasive which will effect the sharpening desired.

What I claim is:

1. A fish hook sharpener of the class described, comprising: a handle forming portion; a sleeve on said portion projecting beyond one end thereof and having a bore formed in the projecting end; and abrasive material mounted in said bore and projecting beyond the end of said sleeve and having on its outward face an inwardly projecting recess for the reception of a fish hook point.

2. A fish hook sharpener of the class described, comprising: a handle forming portion; a sleeve on said portion projecting beyond one end thereof and having a bore formed in the projecting end; and abrasive material mounted in said bore and projecting beyond the end of said sleeve and having on its outward face an inwardly projecting recess for the reception of a fish hook point, said recess being conical in formation.

3. A fish hook sharpener of the class described, comprising: a handle; an abrasive member mounted on one end of said handle and having on its outer face an inwardly projecting conical recess for the reception of a fish hook point.

4. A fish hook sharpener of the class described, comprising: a handle; a cylindrical sleeve mounted on said handle and extending beyond one end thereof, said portion of said sleeve extending beyond said end of said handle being rectangular in cross section and having a rectangular bore; an abrasive member mounted in said bore in a press fit and engaging the end of said handle and projecting beyond the end of said sleeve and having formed in its face projecting beyond said sleeve an inwardly projecting, conical recess for the reception of a fish hook point.

5. A fish hook sharpener of the class described, comprising: a handle; a sleeve mounted on said handle and projecting beyond one end thereof; a pair of abrasive blocks engaging face to face and mounted in the projecting end of said sleeve in a press fit and having formed in their outer faces at their meeting edges a recess, said recesses cooperating to provide an inwardly projecting conical recess for the reception of a fish hook point.

EVERETT MAYER.